G. W. MORGAN, DEC'D.
W. ALEXANDER & R. M. MORGAN, EXECUTORS.
DEVICE FOR USE IN CONNECTION WITH THE DRY MOUNTING OF PHOTOGRAPHIC PRINTS OR THE LIKE.
APPLICATION FILED JUNE 18, 1909.
948,867.
Patented Feb. 8, 1910.
2 SHEETS—SHEET 1.
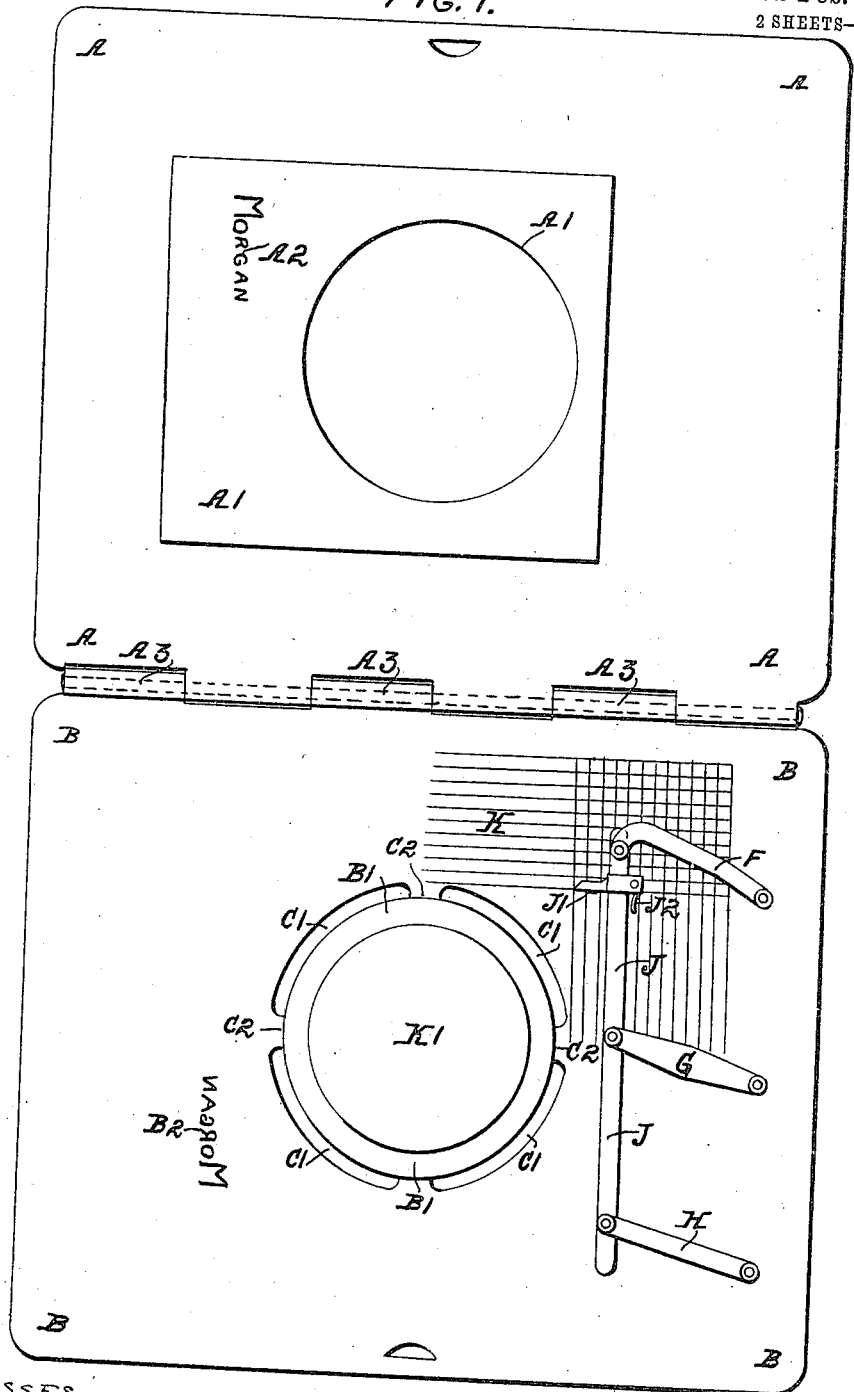

G. W. MORGAN, DEC'D.
W. ALEXANDER & R. M. MORGAN, EXECUTORS.
DEVICE FOR USE IN CONNECTION WITH THE DRY MOUNTING OF PHOTOGRAPHIC PRINTS OR THE LIKE.
APPLICATION FILED JUNE 18, 1909.
948,867.
Patented Feb. 8, 1910.
2 SHEETS—SHEET 2.
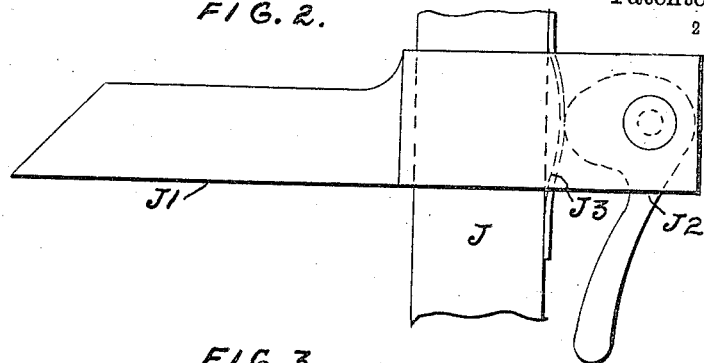
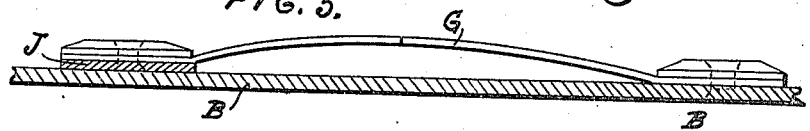
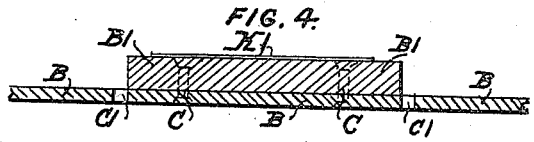
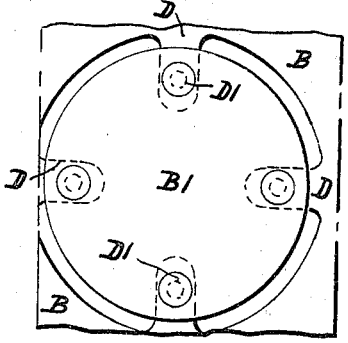
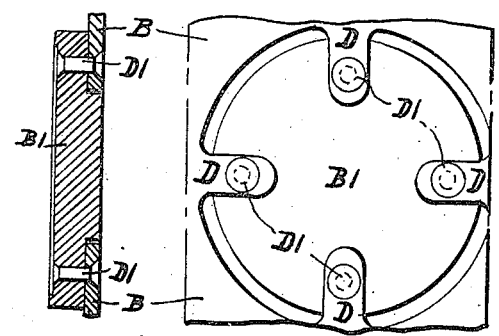
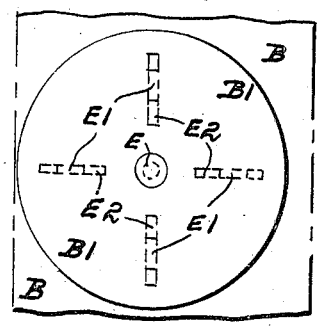
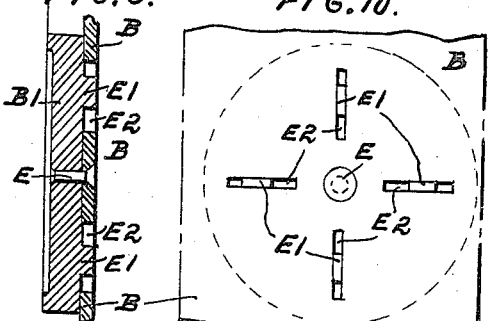
WITNESSES
INVENTOR
George Wilson Morgan
by Howson and Howson
Attorneys

UNITED STATES PATENT OFFICE.

GEORGE WILSON MORGAN, OF ABERDEEN, SCOTLAND; WILLIAM ALEXANDER AND ROBERT MILNE MORGAN EXECUTORS OF SAID GEORGE WILSON MORGAN, DECEASED.

DEVICE FOR USE IN CONNECTION WITH THE DRY MOUNTING OF PHOTOGRAPHIC PRINTS OR THE LIKE.

948,867.     Specification of Letters Patent.     Patented Feb. 8, 1910.

Application filed June 18, 1909. Serial No. 503,028.

*To all whom it may concern:*

Be it known that I, GEORGE WILSON MORGAN, a subject of the King of Great Britain and Ireland, and a resident of Aberdeen, in the county of Aberdeen, Scotland, have invented certain new and useful Improvements in Devices for Use in Connection with the Dry Mounting of Photographic Prints or the Like, and of which the following is the specification.

The invention has for its object to provide an improved device for the dry mounting of photographic prints and the like and of the type consisting of a pair of comparatively thin and flexible metal plates hinged together along one side, the one bearing a die or dies and the other a matrix or matrices for forming a plate-mark or for embossing the mount.

In operating the device, the pair of flexible hinged plates constituting what may be termed a "folder" are opened, the print to be mounted and which is coated with dry mountant or adhesive tissue is laid face down upon the plate-marking die, the mount is superposed, the folder closed and the whole subjected to heat and pressure. The heat and pressure requisite to secure proper adhesion between mount and print is considerable, and it has been found that warping of the flexible plate about the die, if the die be mounted directly upon it, is liable to take place. Moreover, if the metal die be in contact with the surface of the print, glazing of the latter is apt to take place owing to this heat and pressure. Further, without some means to that end, it is difficult to obtain similar register of print upon mount in a series of prints.

According to the invention the die is so mounted upon the flexible plate that relative expansion may take place between them without buckling of the plate and without disturbance of the position of the die, there is provided an adjustable registering device engaged by the edge of the mount, and there are means for the prevention of glazing of the print during the pressing operation, or alternatively for imparting a desired surface to it.

In order that the invention and the manner of performing the same may be properly understood, there are hereunto appended two sheets of explanatory drawings showing in Figure 1 Sheet 1 a diagrammatic plan of the improved folder device in open position, in Figs. 2 and 3, Sheet 2, parts of the registering device to an enlarged scale in plan and in sectional elevation respectively, in Fig. 4 a diagrammatic section showing one method of affixing the die to the flexible plate, and in Figs. 5, 6, 7, and 8, 9, 10 diagrammatic views, respectively, of two other methods.

In the example shown in the drawings, the improved folder consists as usual of two comparatively thin and flexible plates A, B, the one bearing a matrix $A^1$ and it may be also the intaglio $A^2$ of an embossing die for embossing a monogram, name, or device upon the mount, and the other bearing a plate marking die $B^1$ counterpart to the matrix $A^1$ and it may be a relief die $B^2$ counterpart to the intaglio $A^2$. The plates A, B are hinged together by hinges $A^3$.

According to the invention, the plate marking die plate $B^1$ is secured by rivets C (Fig. 4) upon a part of the plate B which is separated by a series of segmental annular slots $C^1$ from the main body of the plate, being connected thereto only by the narrow tongues $C^2$. Consequently, the plate B and die plate $B^1$ are free to expand relatively without buckling taking place, but at the same time their relative positions are preserved. Alternatively, and as shown in diagrammatic example, in front elevation, in section, and in rear elevation in Figs. 5, 6 and 7, the central portion of the plate B is removed, there being left only lugs D which extend inward beneath the die plate $B^1$ occupy recesses cut in the back thereof, and are riveted thereto by rivets $D^1$—or secured by other cognate means. Alternatively again and as shown in like views and like example in Figs. 8, 9 and 10, the die plate $B^1$ is secured to the plate B by a single central rivet E or the like and is provided upon its back with a series of projections $E^1$ engaging slots $E^2$ in the plate B radial to the single point of support E.

These various expansion devices are shown as applied to circular die plates B¹, but it is obvious that they may equally well be applied to and are as effective in the case of die plates of any other desired form.

In order to provide for correct and similar register of a series of mounted prints, there is pivoted upon the ends of a series of links F, G, H, pivoted in turn to the plate B, a straight edge J, the motion of which, as of course the links F, G, H, are the same length, is parallel. The angle of the links also is such that the motion of the straight edge J is as near as may be diagonal—that is to say, it moves along practically the diagonal of the series K of parallel lines ruled at right angles to one another upon the plate B for a guide in mounting. The moving of the straight edge J upon its links gives therefore adjustment relatively to the die plate B¹ for one side of the mount. For the adjacent side at right angles thereto there is provided upon the straight edge J a lengthwise movable guide head having a face J¹ at right angles thereto.

As will be seen in Fig. 3, this guide head is formed with a jaw embracing the straight edge J, and beyond the straight edge there is pivoted in the jaw a cam-lever J² which, engaging a spring J³ held loosely between the jaws, forces that spring against the back of the straight edge and so locks the guide head in any desired position, while the latter is relieved and may be moved along upon turning the cam lever J² outward. The link F is so curved that the guide head may be moved closely to that end of the straight edge when the latter is in extreme position for large mounts.

In order to hold the straight edge J securely in position when once adjusted, the link G may be of spring form as shown in Fig. 3 and be so set as to press the straight edge into close contact with the plate B and frictionally prevent its movement. Or more or all of the links may be of spring form.

The heat and pressure to which the print is subjected, while in contact with the marking die B¹, is such that, if the metal surface of that die be in contact with the print, glazing or other marking is likely to ensue. In order to avoid this, and, if desired, to give at the same time a particular texture to the surface of the print, there is secured, by any suitable adhesive or cement to that part of the marking die B¹ upon which the print lies during the plate-marking and mounting operation, a sheet K¹ of material preferably to a certain small extent a non-conductor and having a surface comparatively soft—so as not to cause glazing of the print—or of a desired texture to be communicated to the print. The material employed may very conveniently be paper, or it may be a textile material such as linen or bolting silk—these latter when it is desired to give a corresponding texture to the print. If the paper or other material be fixed upon the marking die B¹ and so used, its edges will form what may be termed a light subsidiary plate-mark, and this under some circumstances may be desirable. When such a subsidiary plate-mark is not desirable either the edges of the paper or other material after it has been fixed upon the marking die may be reduced in thickness by sand-papering or similar means or, to the same end, the marking die may be slightly recessed to receive the paper or other material (see Fig. 6). Or again (see Fig. 9), the recess may be deeper than the thickness of the material and a slight embossing effect be thus obtained. The protecting material further serves as a guide for the adjustment of the print being mounted.

What I claim is:—

1. In a photographic and other print dry-mounting apparatus consisting of a pair of comparatively thin and flexible plates hinged together along one side and the one bearing a die and the other a matrix for that die, means for preventing buckling of the die, means for preventing direct contact of its surface with the surface of the print and an adjustable alinement guide for the print.

2. In a photographic and other print dry-mounting apparatus consisting of a pair of comparatively thin and flexible plates hinged together along one side and the one bearing a die and the other a matrix for that die, a device between die and plate to permit of relative expansion and so prevent buckling.

3. In a photographic and other print dry-mounting apparatus consisting of a pair of comparatively thin and flexible plates hinged together along one side and the one bearing a die and the other a matrix for that die, a die secured to the central part of the one plate and comparatively narrow webs connecting that part with the remainder of the plate.

4. In a dry print mounting apparatus, a comparatively thin plate and a die carried thereby, the joint between said die and plate being formed to prevent the buckling of the plate at the die under heat, in combination with a matrix adapted to be pressed against the die.

5. In a dry print mounting apparatus, a comparatively thin plate and a die carried thereby, and recessed on its face to receive a protective sheet, the joint between said die and plate being formed to prevent the buckling of the plate at the die under heat, in combination with a matrix adapted to be pressed against the die.

6. In a photographic and other print dry-mounting apparatus consisting of a pair of comparatively thin and flexible plates hinged together along one side and the one bearing a die and the other a matrix for that die, means for preventing buckling of the die, and a sheet of material protective of the surface of the print secured to the face of the die.

7. In a photographic and other print dry-mounting apparatus consisting of a pair of comparatively thin and flexible plates hinged together along one side and the one bearing a die and the other a matrix for that die, means for preventing buckling of the die, and a sheet of protective material formed to give an impressed surface to the print secured to the face of the die.

8. In a photographic and other print dry-mounting apparatus consisting of a pair of comparatively thin and flexible plates hinged together along one side and the one bearing a die and the other a matrix for that die, means for preventing buckling of the die and a sheet of protective material said sheet being formed to make an impress of itself thereon and secured to the face of the die.

9. In a photographic and other print dry-mounting apparatus consisting of a pair of comparatively thin and flexible plates hinged together along one side and the one bearing a die and the other a matrix for that die, means for preventing buckling of the die, and a sheet of protective material formed to give a desired impressed surface to the print and to make an impress of itself thereon, said sheet being secured to the face of the die.

10. In a photographic and other print dry-mounting apparatus consisting of a pair of comparatively thin and flexible plates hinged together along one side and the one bearing a die and the other a matrix for that die, means for preventing buckling of the die, and a sheet of material protective of the surface of the print and so recessed into the die to which it is secured as to make an impress of itself upon the print.

11. In a photographic and other print dry-mounting apparatus consisting of a pair of comparatively thin and flexible plates hinged together along one side and the one bearing a die and the other a matrix for that die, means for preventing buckling of the die, and a sheet of material protective of the surface of the print, but formed to give a desired impressed surface to the print so recessed into the die to which it is secured as to make an impress of itself upon the print.

12. In a photographic and other print dry-mounting apparatus consisting of a pair of comparatively thin and flexible plates hinged together along one side and the one bearing a die and the other a matrix for that die, means for preventing buckling of the die, and a register device consisting of a straight edge parallel with the edge of the plate and means for moving it diagonally parallel thereto and for securing it.

13. In a photographic and other print dry-mounting apparatus consisting of a pair of comparatively thin and flexible plates hinged together along one side and the one bearing a die and the other a matrix for that die, means for preventing buckling of the die, and a register device consisting of a straight edge, links pivoted thereon and to the plate and adapted to give to the straight edge a parallel motion and means for locking it.

14. In a photographic and other print dry-mounting apparatus consisting of a pair of comparatively thin and flexible plates hinged together along one side and the one bearing a die and the other a matrix for that die, means for preventing buckling of the die, and a register device consisting of a straight edge, links pivoted thereon and to the plate and adapted to give to the straight edge a parallel motion, one of the links being of spring form and adapted to press the straight edge into contact with the plate and lock it frictionally.

15. In a photographic and other print dry-mounting apparatus consisting of a pair of comparatively thin and flexible plates hinged together along one side and the one bearing a die and the other a matrix for that die, means for preventing buckling of the die, and a register device consisting of a straight edge parallel with the edge of the plate and means for moving it diagonally parallel thereto and for securing it, and upon the straight edge a guide slidable thereon and at right angles thereto and means for locking it.

16. In a photographic and other print dry-mounting apparatus consisting of a pair of comparatively thin and flexible plates hinged together along one side and the one bearing a die and the other a matrix for that die, means for preventing buckling of the die, and a register device consisting of a straight edge, links pivoted thereon and to the plate and adapted to give to the straight edge a parallel motion and means for locking it and upon the straight edge a guide slidable thereon and at right angles thereto and means for locking the guide.

17. In a photographic and other print dry-mounting apparatus consisting of a pair of comparatively thin and flexible plates hinged together along one side and the one bearing a die and the other a matrix for that die, means for preventing buckling of the die, and a register device consisting of a straight edge, links pivoted thereon and to the plate and adapted to give to the straight edge a parallel motion, one of the links being of spring form and adapted to press the straight edge into contact with the plate and lock it frictionally and upon the straight edge a guide slidable thereon and at right angles thereto and means for locking the guide.

In testimony whereof I have signed my name to this specification, in the presence of two subscribing witnesses.

GEORGE WILSON MORGAN.

Witnesses:
WILLIAM P. QUANN,
MARION B. LAWSON.